United States Patent [19]
Boutet et al.

[11] Patent Number: 5,277,322
[45] Date of Patent: Jan. 11, 1994

[54] PALLET FOR HOLDING A CASSETTE

[75] Inventors: John C. Boutet; James F. Owen; Wayne J. Arseneault, all of Rochester; Jeffrey J. Yaskow, Williamson; Thomas D. Baker, Livonia, all of N.Y.

[73] Assignee: Eastman Kodak Company, Rochester, N.Y.

[21] Appl. No.: 981,710

[22] Filed: Nov. 25, 1992

[51] Int. Cl.⁵ ............................................. A47F 7/00
[52] U.S. Cl. ................................... 211/41; 108/51.1; 206/455
[58] Field of Search ............... 211/41; 108/51.1, 54.1; 206/455; 250/327.2A; 378/173

[56] References Cited

U.S. PATENT DOCUMENTS

| | | | |
|---|---|---|---|
| 4,681,227 | 7/1987 | Tamura et al. | 206/455 |
| 4,816,676 | 3/1989 | Aagano | 250/327.2 |
| 4,878,799 | 11/1989 | Seto et al. | 414/331 |
| 4,924,486 | 5/1990 | Weber et al. | 378/173 |
| 4,931,641 | 6/1990 | Ohgoda | 250/327.2 |
| 4,961,000 | 10/1990 | Finkenzeller et al. | 250/484.1 |
| 4,985,909 | 1/1991 | Bjoerk et al. | 378/173 |
| 4,988,874 | 1/1991 | Muraishi | 250/327.2 |
| 5,059,806 | 10/1991 | Burgkhardt et al. | 250/484.1 |
| 5,065,866 | 11/1991 | Boutet et al. | 206/455 |
| 5,172,503 | 12/1992 | Dane et al. | 206/455 X |
| 5,186,338 | 2/1993 | Boutet | 206/455 X |

Primary Examiner—Robert W. Gibson, Jr.
Attorney, Agent, or Firm—Frank Pincelli

[57] ABSTRACT

A pallet for holding at least two different size cassettes, each cassette having a pair of side walls, a front wall and back wall. The pallet comprises a support surface for supporting a cassette, a first internal side wall for registering one of the side walls of the cassette placed on the support surface, and a second internal side wall for registering the back wall of a cassette. The first, and second internal side walls of the pallet define a first recess for holding in position a cassette of a first size. A retractable member is provided on the pallet for defining a second recess of a second size within the first recess for holding a cassette of a second smaller size.

27 Claims, 9 Drawing Sheets

PALLET FOR HOLDING A CASSETTE

FIELD OF THE INVENTION

This invention relates to a pallet for holding and transporting a cassette, and more particularly, to a pallet which facilitates handling of multiple size cassettes of the kind used in computed radiographics.

BACKGROUND OF THE INVENTION

It is known from U.S. Pat. No. 4,878,799, issued Nov. 7, 1989, to provide a machine for unloading film sheets from magazines. More specifically, the machine as disclosed in such patent has movable trays for supporting a plurality of magazines, and the trays are spaced from each other in a vertical direction. The trays are supported by an elevator for movement in a vertical direction as a unit. When a tray is in a particular vertical position, the tray and magazine are moved to an unloading position where the sheet in the magazine can be removed by suction cups. The removed sheets are then fed to a cassette or to a photographing device for exposure.

In computed radiography, a photographic element, such as a stimulable phosphorus sheet or rigid plate, is exposed to form a latent image. The exposed photographic element is taken to a reader where the photographic element is stimulated to produce a light pattern that can be read and recorded. The photographic element is erased and can be reused again. It is common to manually transport the cassette containing the photographic element from the exposure apparatus to the reader and manually insert it into the reader. The operator then waits until the image is read, a photographic element is erased and returned to the operator. While this procedure may be satisfactory, it requires much time and effort by the operator. Operator time is increased when the reader is relatively slow in reading and erasing the photographic element, and this can require more than a full minute of time. It clearly is desirable to minimize the time required by an operator, and to do so in a way which makes it feasible for the automatic feeding of cassettes to the reader.

There has also been disclosed in the prior art use of an automatic storage and feeding apparatus for delivering of cassettes to a reader. Typically, a plurality of movable positions are provided wherein the cassettes are moved through a reading position wherein a cassette is delivered to the reader for processing of the photographic element. It is important that the cassettes be precisely positioned with respect to the reader so that the photographic element can be easily and correctly removed. It is also important that the weight of the cassettes be held down to a minimum. In order to accommodate more than one size cassette in the autoloader, there has been suggested the providing of various size pallets for holding different size cassettes. However, some of these pallets have been limited to one size and have added significant weight to the pallet and cassette combination. While some have suggested use of the providing of a pallet for holding more than one size cassette, there has been difficulty providing these pallets such that they will not interfere with the autoloading process and provide the cassette/pallet in the position adequate for accurate alignment with the reader.

Thus, the present invention provides a pallet for holding cassettes of different sizes which simplifies the handling of the cassette, reduces operator time required to provide the cassette to a reader, is easy to use, is low cost, and provides the pallet in a seated position to the reader.

SUMMARY OF THE INVENTION

In accordance with one aspect of the present invention, there is provided a pallet for holding at least two different size cassettes, each cassette having a pair of side walls, a front wall and back wall. The pallet comprises a support surface for supporting a cassette, a first internal side wall for registering one of the side walls of the cassette placed on the support surface, and a second internal side wall for registering the back wall of a cassette. The first, and second internal side walls of the pallet define a first recess for holding in position a cassette of a first size. Retractable means are provided on the pallet for defining a second recess of a second size within the first recess for holding a cassette of a second size.

The invention and its objects and advantages will become more apparent in the detailed description of the preferred embodiment presented below.

DESCRIPTION OF THE DRAWINGS

In the detailed description of the preferred embodiment presented below, reference is made to the accompanying drawings, in which.

DETAILED DESCRIPTION

Figure 1:
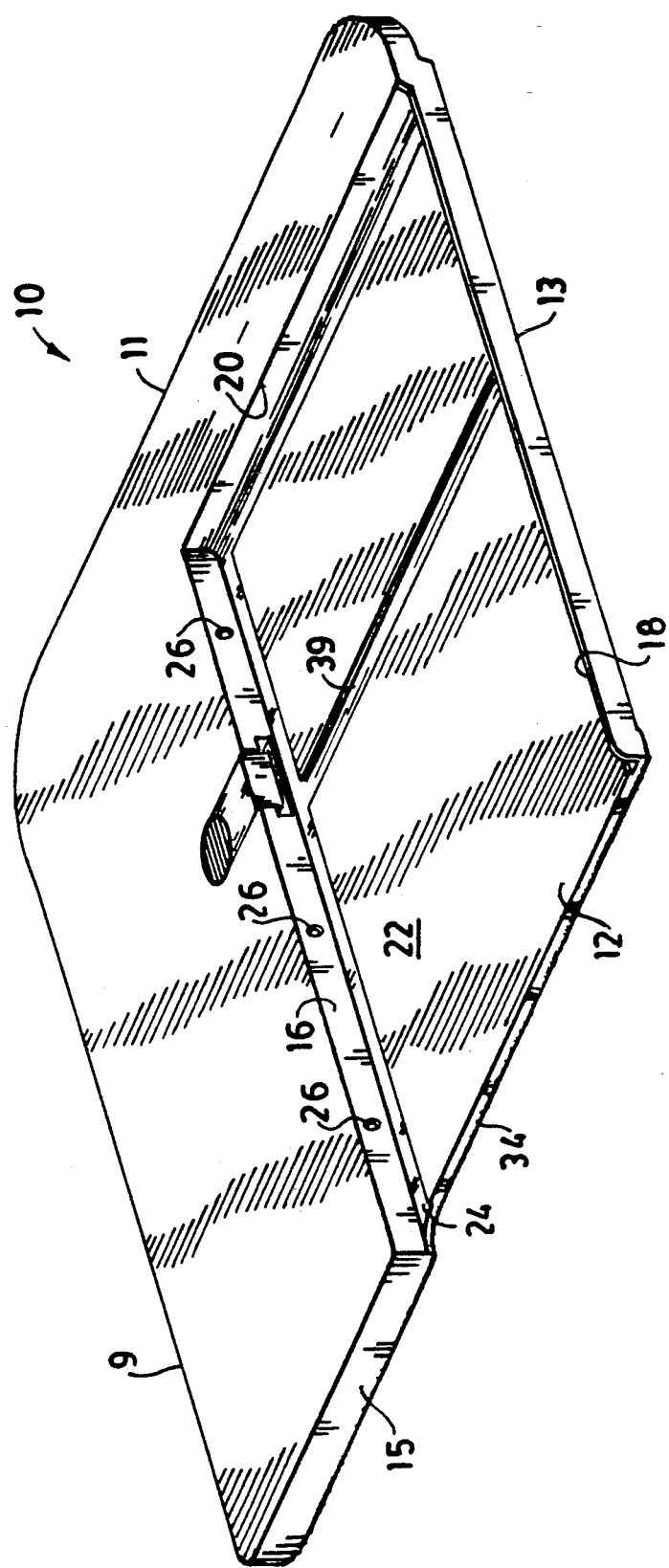
FIG. 1 is a top perspective view of a pallet made in accordance with the present invention.
Figure 2:
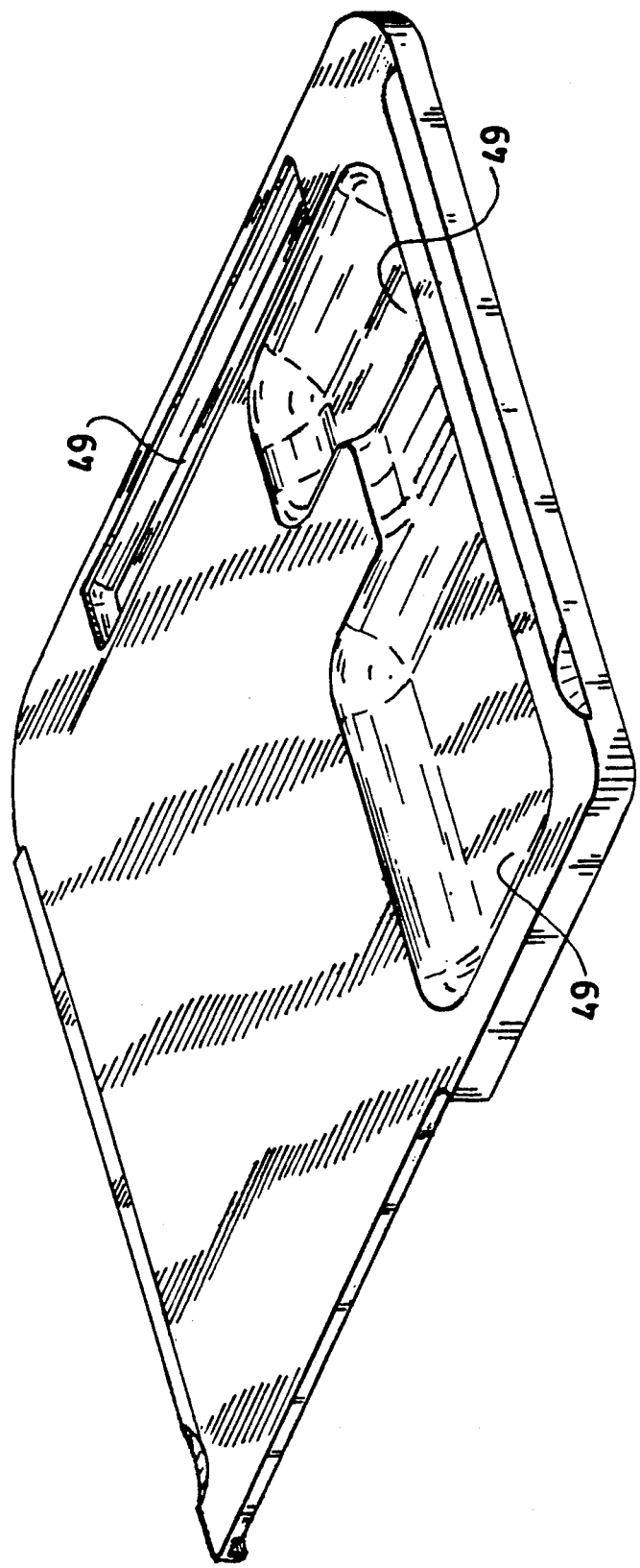
FIG. 2 is a bottom perspective view of the pallet of FIG. 1.

Referring to FIGS. 1-15, a pallet 10 made in accordance with the present invention is illustrated. Preferably, as illustrated, the pallet 10 is an integrally formed part, preferably made of a material that is easily molded. In the particular embodiment illustrated, the pallet 10 is made out of plastic materials that can be cast, used in the RIM process, injection molded, or other molding techniques. In the particular embodiment illustrated a high durometer polyurethane plastic was used.

The pallet 10 comprises a generally rectangular support surface 12 for supporting a cassette 14 and having an outer perimeter formed outer side walls 9, 11, 13, and 15. The overall size of the pallet 10 formed by outer sidewalls 9, 13, and 15 is substantially equal to the largest size cassette the autoloader is designed to receive. The pallet containing a cassette will be sensed simply being a cassette. The cassette 14 (see FIG. 4) is designed to hold a photographic element for retaining an image thereon. In the particular embodiment illustrated, the cassette 14 is designed to hold a stimulable phosphor sheet or rigid plate that can be removed therefrom. The pallet 10 further includes a first internal side wall 16 disposed adjacent said support surface for registering a first side wall 17 of cassette 14. A second internal side wall 18 is also provided on the pallet 10 for registering the second side wall 19 of cassette 14. The pallet further comprises a third internal side wall 20 for registering the back wall 21 of the cassette 14. The first, second, and third side walls 16, 18 and 20 define a recess 22 for holding and retaining cassette 14 having a first size. A narrow recess/trough 24 is provided adjacent the side walls 16, 18 and 20 for receiving a ridge portion typically provided along the perimeter of the cassette 14. The height H of the internal side walls 16,18,20 are designed such that the top of the cassette 14 is flush or extends slightly above the pallet 10. This allows the top of the cassette 14 to act as a registration surface which assists in firmly and accurately aligning the cassette 14 with respect to the mechanism for removing the photographic element from the cassette and delivering it to the adjacent reader.

Means are provided for securely holding the cassette 14 within the recess 22 and biasing the casette toward internal sidewall 16. In the particular embodiment illustrated a plurality of detent elements 26 are provided within recesses in internal sidewall 18. The detent elements 26 each comprise outer sleeve 27 with a spring 29 enclosed therein which biases a captured ball 31 at the end of the sleeve 27. The detent elements 26 are placed in the sidewall 16 such that a biasing force is applied against sidewall 19 of cassette 14. However, the force is small enough so that it can be easily over come. Such detent elements 26 are well known in the art. Suitable detent elements may be purchased from Vlier located at 2333 Valley Street, Burhawk, Calif.

Figure 3:
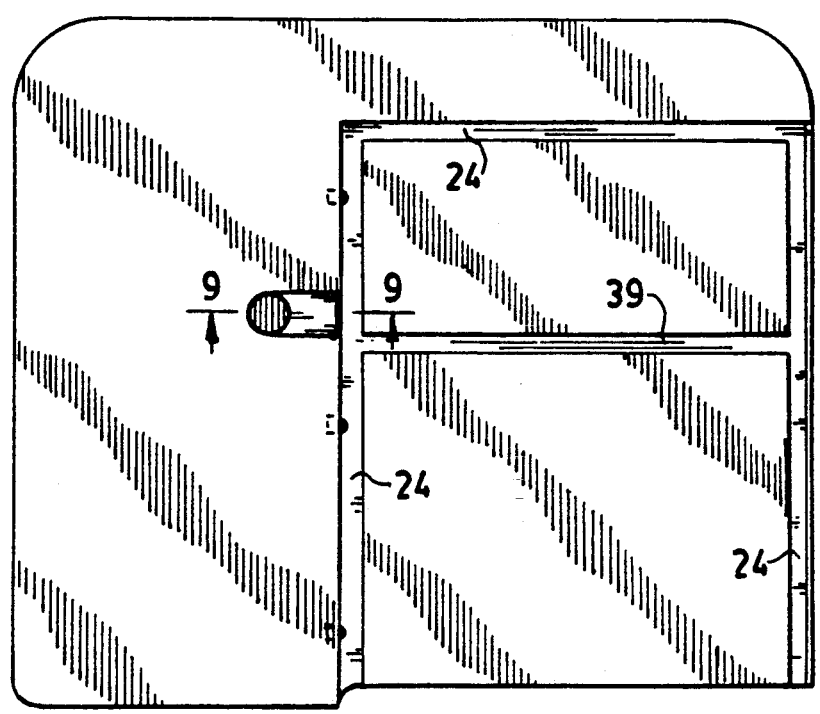
FIG. 3 is a top plan view of FIG. 1.
Figure 4:
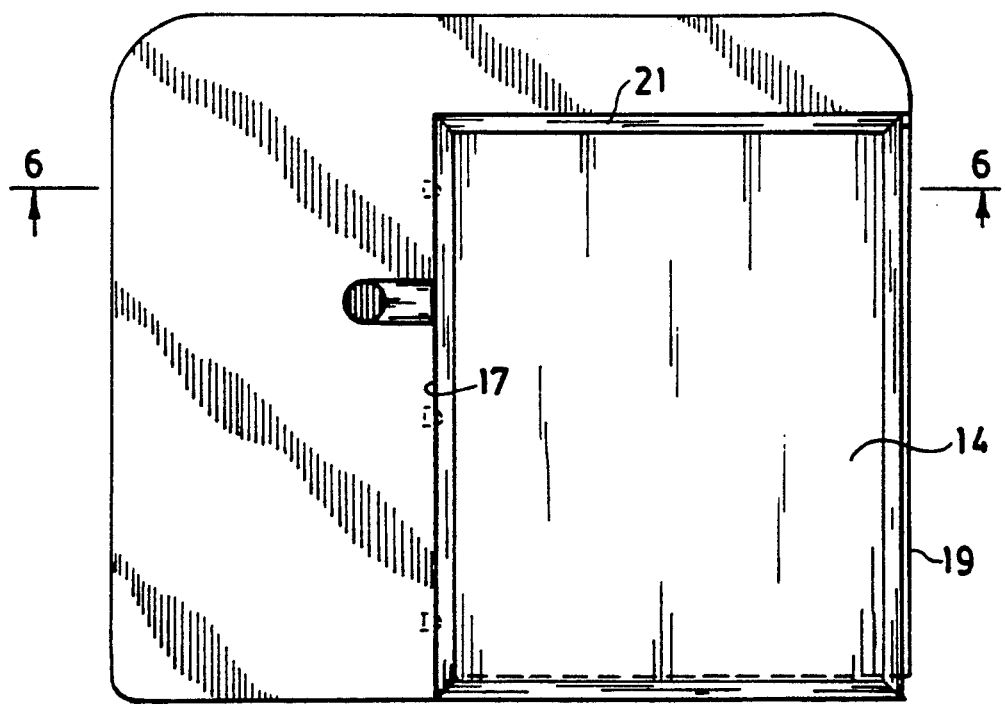
FIG. 4 is a top plan view similar to FIG. 3 illustrating a cassette of a first size disposed on the pallet.
Figure 5:
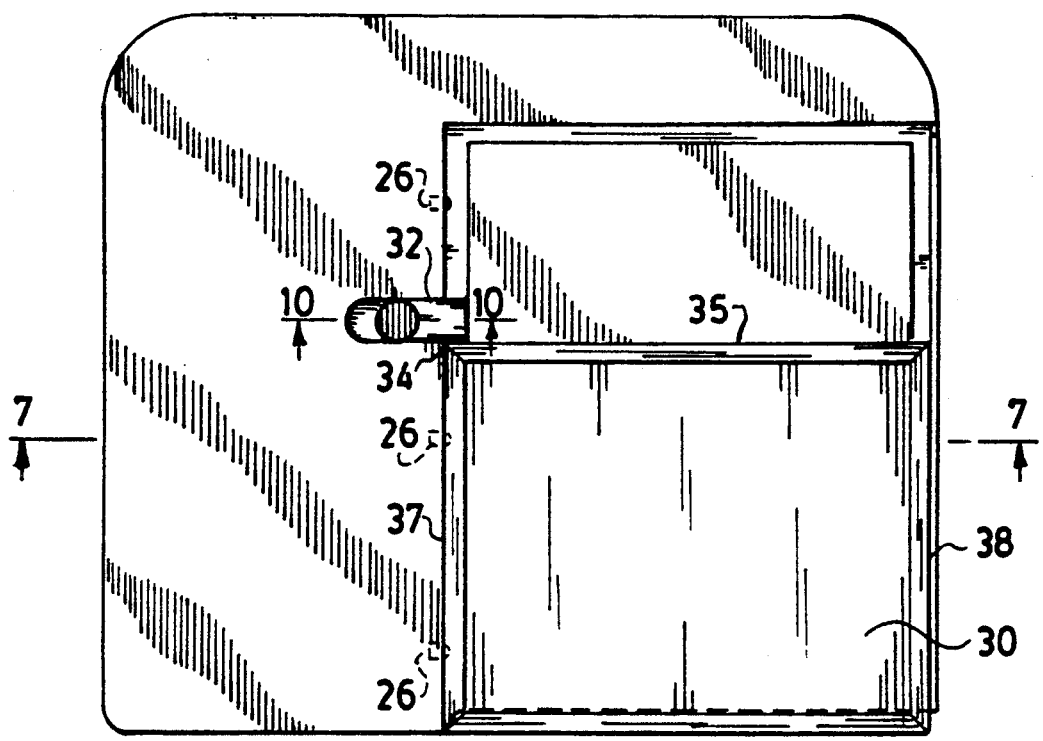
FIG. 5 is a top plan view similar to FIG. 3 illustrating a cassette of a second size disposed on the pallet.
Figure 6:
FIG. 6 is a cross-sectional view of the pallet and cassette of FIG. 4 as taken along line 6—6 of FIG. 4.
Figure 7:
FIG. 7 is a cross-sectional view of the pallet cassette of FIG. 5 as taken along line 7—7 of FIG. 5.
Figure 7A:
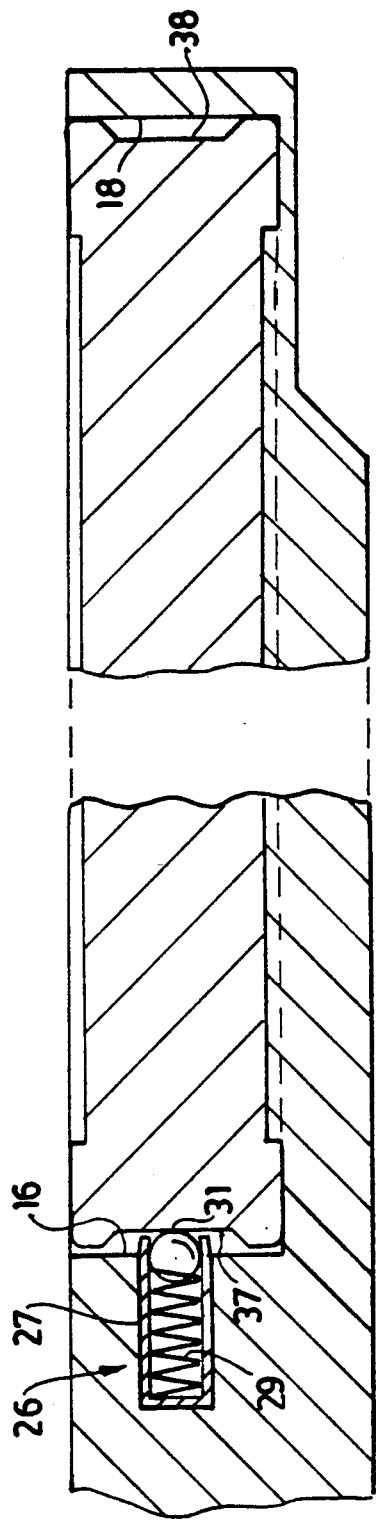
FIG. 7A is an enlarged view partially broken away of the pallet, and cassette of FIG. 7.
Figure 8A:
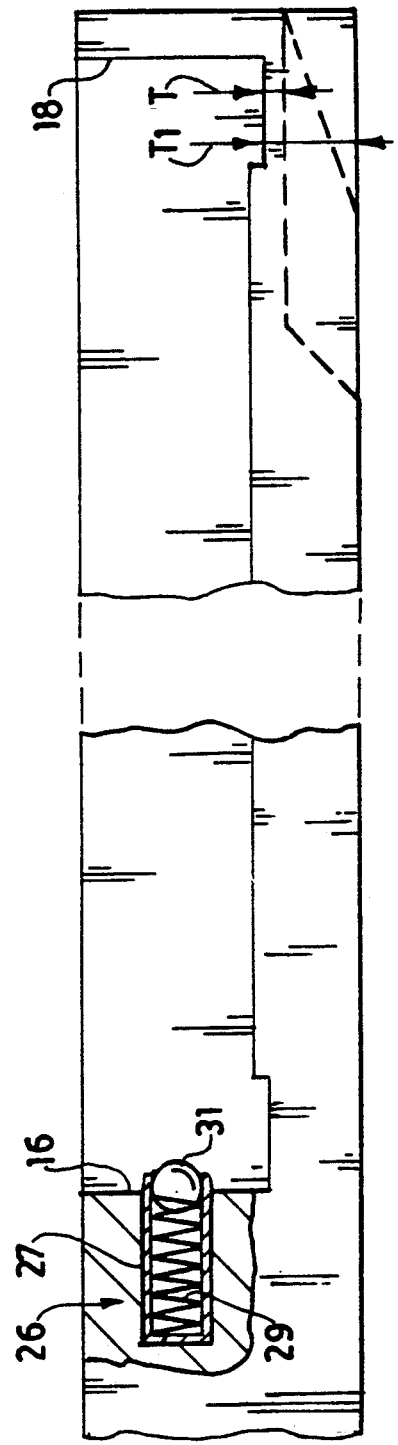
FIG. 8A is an enlarged partially broken away view of the pallet.
Figure 8:
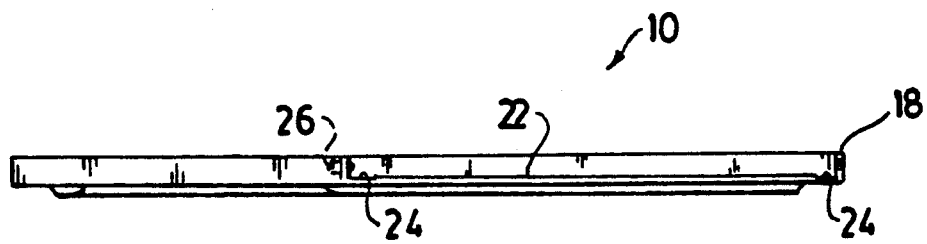
FIG. 8 is a view similar to FIG. 7 without the cassette thereon.
Figure 9:
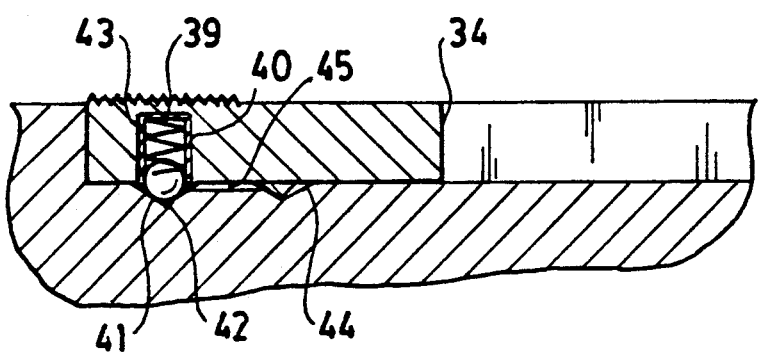
FIG. 9 is an enlarged cross-sectional view of a portion of the pallet illustrated in FIG. 3 as taken along line 9—9 illustrating the projection means in the retracted position of a second size.
Figure 10:
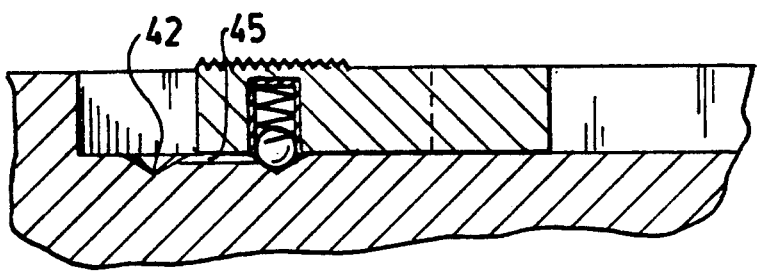
FIG. 10 is a view similar to FIG. 9 illustrating the projection means in the extended position for defining a wall section for supporting a cassette of a second size.
Figure 12:
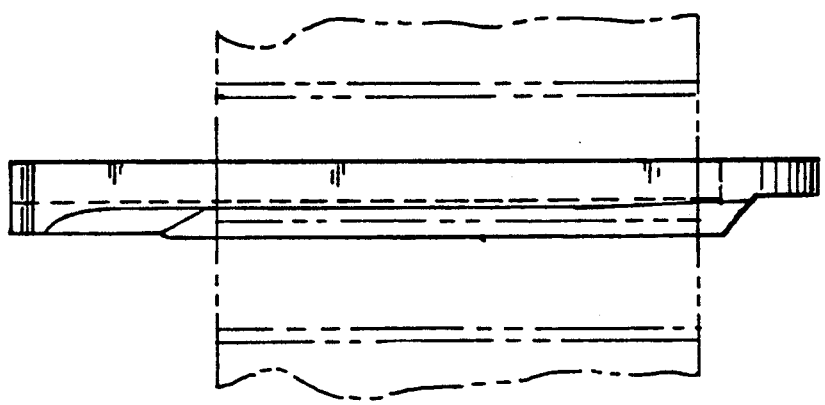
FIG. 12 is side view of the cassette and cog belt of FIG. 11.
Figure 11:
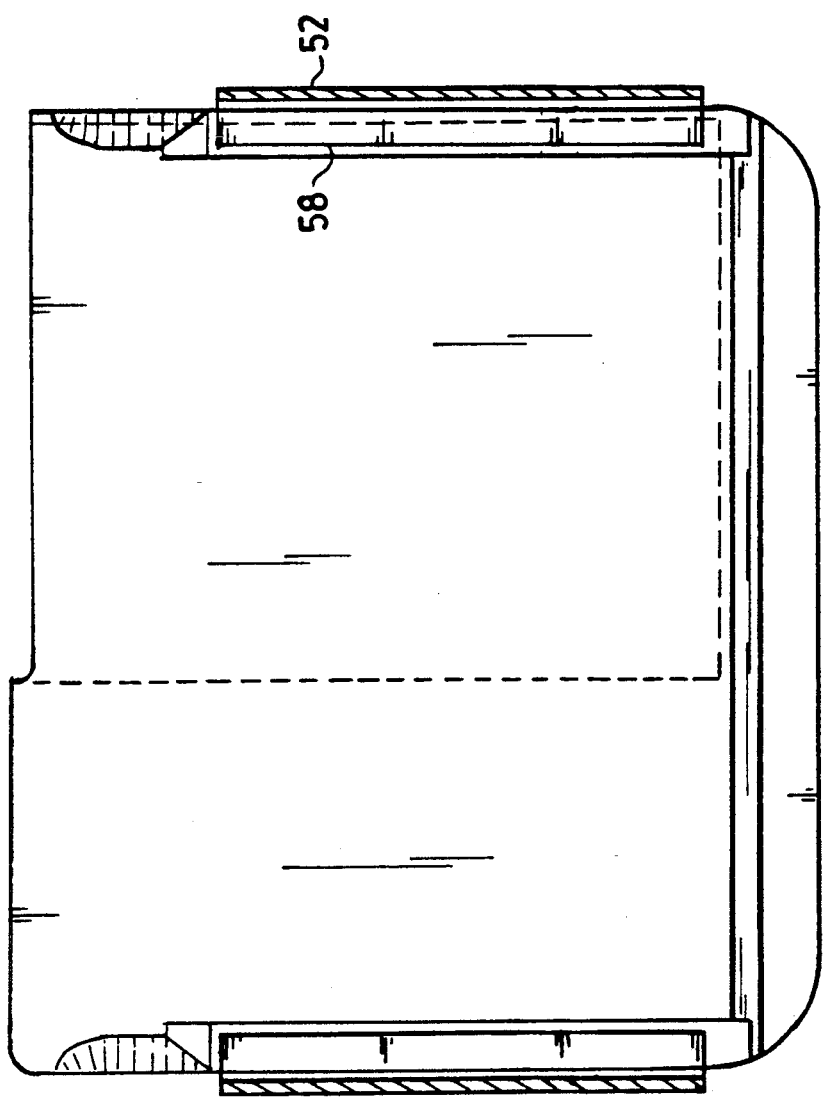
FIG. 11 is a bottom plan view of the pallet of FIG. 10 as positioned on a cog belt in an autoloader for automatically supplying cassettes to a reader.
Figure 13:
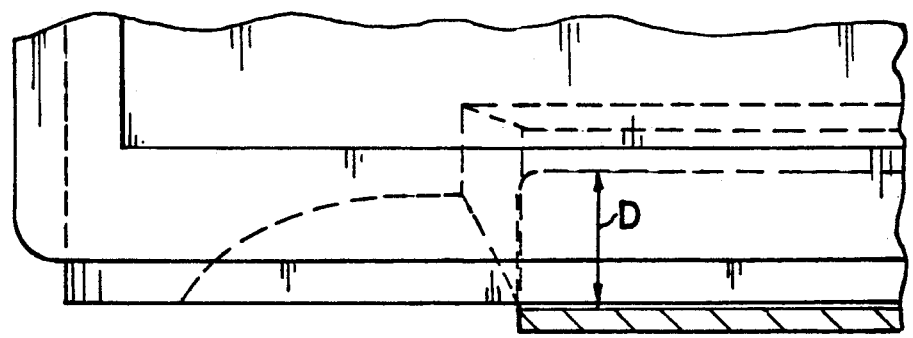
FIG. 13 is an enlarged partial view of the cassette and pallet.

The pallet 10 is also provided with means so that a cassette of a second size may be supported on support surface 12. Referring to FIG. 5 there is illustrated a top plan view of pallet 10 holding a cassette 30 of a size smaller than cassette 14. In particular, there is provided a projection 32 which is retractably mounted to the pallet 10. In the preferred embodiment illustrated, the projection 32 is slideably mounted such that it can move between a first position, as illustrated in FIG. 3, such that a cassette 14 can be supported on the support surface 12, and a second position, as illustrated in FIG. 5, for supporting a cassette 30 smaller in size than cassette 14. Projection 32 has a forward engaging surface 34 designed to register against the back wall 35 of cassette 30. The remaining side walls 37,38 of cassette 30 will register against the adjacent internal side walls 16 and 18, respectively. The sidewalls 16,18 and projection 32 combine to form a recess 36 designed to receive and hold in position cassette 30. A recess 39 is provided which connects recesses 24 adjacent sidewalls 16,18 and substantially parallel to the forward engaging surface 34 so as to receive the rear ridge of the cassette 30 designed for recess 36.

Means are provided on the projection 32 for locking projection 32 in either of the two positions illustrated in FIGS. 3 and 5. In the particular embodiment illustrated, projection 32 is provided with a recess (see FIG. 9) which holds a detent element 40. Detent element 40 is similar to detent element 26 both in function and design. Detent 40 has a ball 41 designed to engage either of recesses 42 or 44 provided on the surface of pallet 10. When the projection 32 is in its first position such that cassette 14 can be placed on support surface 12, the ball 41 of detent element 40 engages recess 42. The spring 43 in detent element 40 holds projection 32 in position. However, the biasing force provided by spring 43 can be easily overcome by simply sliding the projection 32 outward to the position illustrated in FIG. 5. This causes the spring biased ball 41 to come out of recess 42 and ride in the shallow groove 45 connecting recesses 42,44 until reaching the second recess 44 whereby the ball 41 will seat into recesses 44 so as to lock projection 32 into the second position. This provides a simple method of securing the projection 32 into one of two positions. It is to be understood that various other means may be provided for locking this projection in the two positions.

The pallet 10 of the present invention is designed to be used with a autoloader and reader such that individual cassettes can be removed from a stack of cassettes placed in the autoloader and automatically fed to an adjacent reader. In such a set up it is important that the cassette be properly registered so that the photographic element can be accurately removed and read and then returned to the cassette. Thus it is extremely important the cassette 14 be properly positioned. This becomes even more difficult to accomplish when pallets are used to hold various size casettes. Thus, it is important that the pallet not interfere with the proper registering of the cassette with the reader. In order to accommodate different size casettes, the mechanism used to locate and clamp the cassette relies on mating with the top surface of the cassette 14 and locating one side of the cassette 14. Therefore, as previously stated, the pallet is designed so that the top surface 48 of the cassette is flush with or extends above the adjacent sidewalls of the pallet. It is also important that the portion of the pallet 10 that forms the internal side wall 18 be as thin as possible. The side wall 18 preferably has a thickness T no greater than about 0.125 inches (0.3175 cms).

Figure 14:
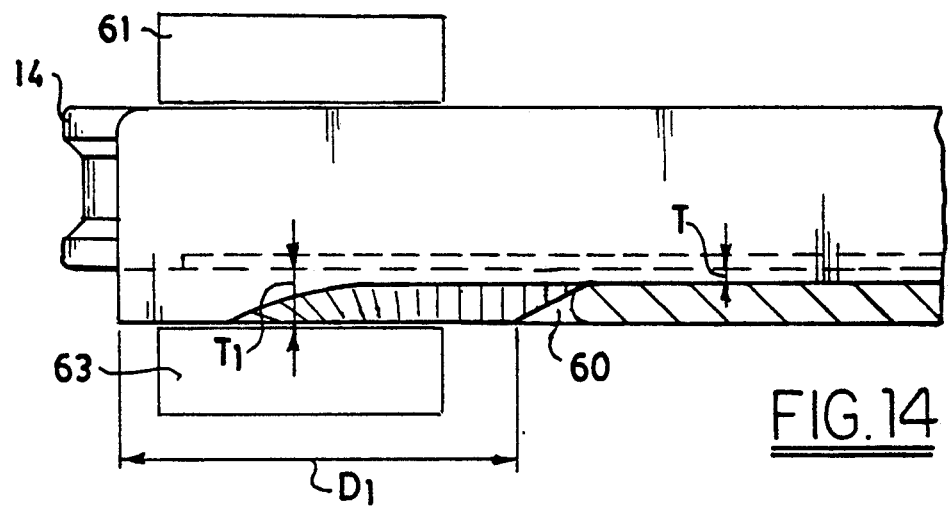
FIG. 14 is an enlarged partial view of FIG. 12.
Figure 15:
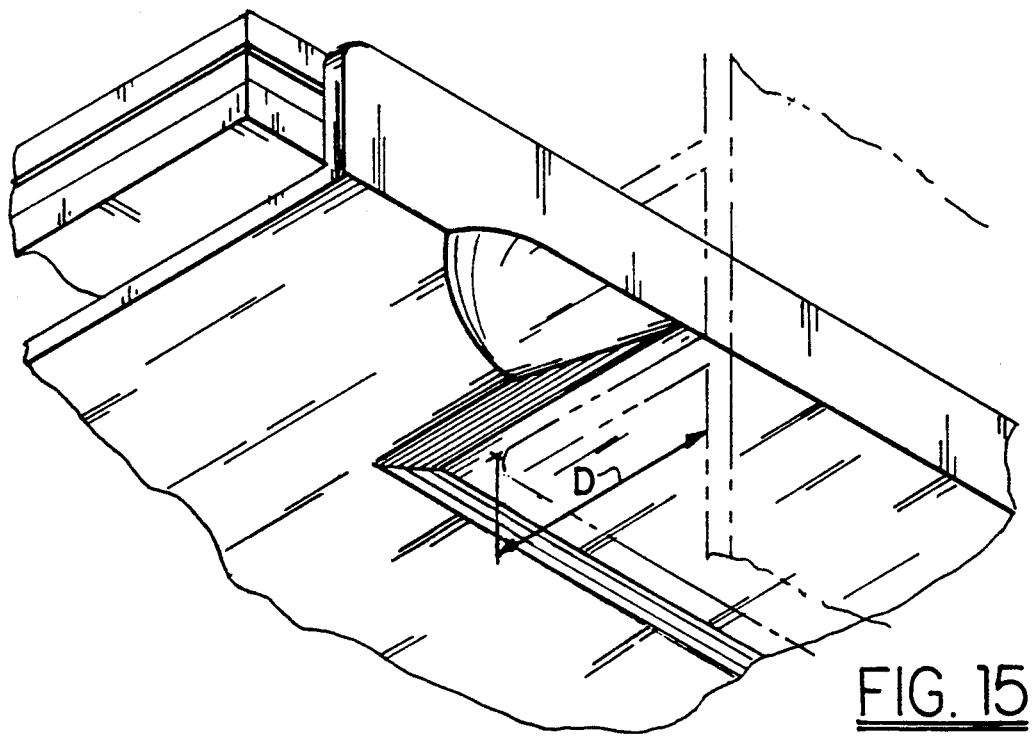
FIG. 15 is a side and bottom view of the pallet of FIG. 11 as positioned on the cog belt.

The pallet preferably does not add any significant weight to the overall system. Thus, it is desirable that the pallet 10 be formed such that it have a sufficient degree of strength, yet have a weight that does not add significantly to the overall weight that the autoloader must support in providing the cassette to the adjacent reader. Additionally, it is desirable that the weight of the pallet 10 and cassette thereon not be greater than the weight of the largest cassette the autoloader is designed to hold and the center of gravity of the pallet 10 with cassette be in the center area of the pallet so as to make it easier to handle the pallet 10 and cassette assembly. Accordingly, the bottom of the pallet is provided with recess cut-out sections 49 in that portion illustrated in FIG. 2. In the particular embodiment illustrated the pallet 10 is designed to be used in an autoloader which utilizes a pair of spaced cog belts, each belt having a plurality of shelves designed to support a plurality of cassettes or pallets containing cassettes. Referring to FIGS. 11-15, there is illustrated a pallet 14 being supported by a pair of spaced shelves 58 secured to a pair of spaced cog belts 52. The shelves 58 extend beneath the cassette a distance D and start at a point spaced behind the forward edge of the cassette a distance D1. The spacing D1 at the forward edge provides an unobstructed area where the cassette and pallet can be engaged so as to move the cassette and pallet, for example, into an adjacent reader. Means for engaging may take the form of a pair of pinch roller assemblies which engage the sides of the cassette as is more fully described in co-pending application of John C. Boutet, Darryl D. DeWolff, Roger Brahm and Jeff Yaskow, entitled "Autoloader for Cassettes and/or Pallets", filed concurrently herewith and which is hereby incorporated by reference. As previously stated, it is important that the pallet be as thin as possible in order to fit with the autoloader and not interfere with clamping of the cassette and pallet combination. The pallet is provided with a recess 60 in the area in which the shelves extend beneath the pallet 10. In this area the support surface 12 has a thickness T as thin as possible without disturbing the structural integrity of the pallet 10. In the particular embodiment illustrated the thickness T is about 0.08 inches (0.2032 cms). The pallet 10 in the clamping area has a thickness T1 which is greater than the thickness T in the conveyor shelf area so as to provide greater structural stability to the pallet 10. The limits of T and T1 are preferably such that the bottom of the pallet does extend below the bottom of the shelf so as to avoid invading the space of the next adjacent lower conveyor position. In the particular embodiment illustrated the thickness T1 is about 0.165 inches (0.45 cm). When the pallet is moved between clamp jaw 61,63 for presentation to the adjacent reader as illustrated in FIG. 14. Since the rear portion 65 (see FIG. 2) of the pallet 10 is the part most likely to touch the cog belt 52 if it is tipped up or down slightly when clamped in the clamp jaws, the thickness of the pallet 10 in this area. This is especially beneficial in reducing or eliminating the transmission of vibrations to the reader.

As previously discussed, the pallet 10 has an overall size of a first cassette which the autoloader and reader is designed to receive. Thus, both the autoloader and reader will treat the pallet and cassette assembly as it would a maximum size cassette which it is designed to receive.

Figure 16:
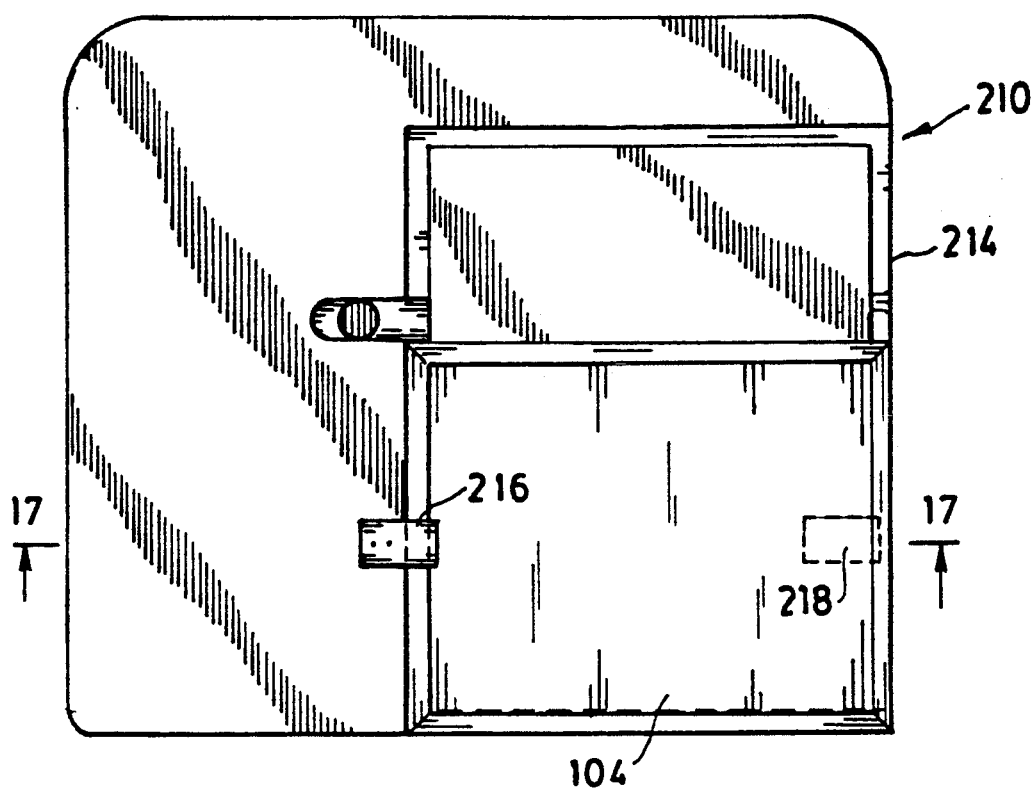
FIG. 16 is a top plan view of a modified pallet made in accordance with the present invention having a cassette thereon.
Figure 17:
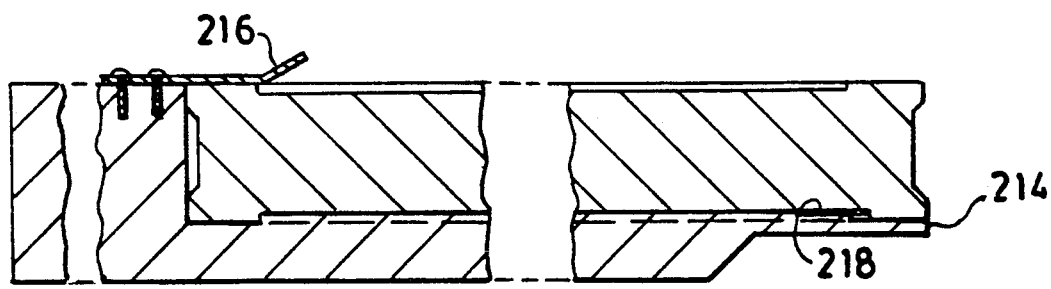
FIG. 17 is a cross sectional view of the casette and pallet of FIG. 16 as taken along line 17—17.
Figure 18:
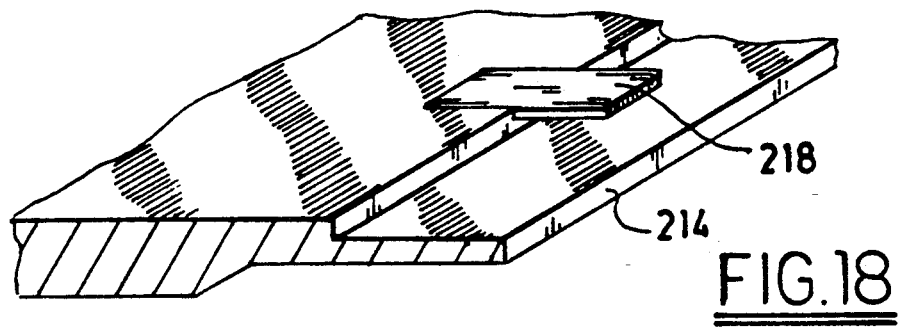
FIG. 18 is an enlarged partial view of FIG. 17.

Referring to FIGS. 16-18, there is illustrated yet a modified pallet 210 made in accordance with the present invention. Pallet 210 is similar to pallet 10, like numeral indicating like parts. In this embodiment the internal side wall 18 has been eliminated so as to allow the side 19 of the cassette to be flush with the edge 214 of the pallet or extend slightly past the edge 214. In this way the reader can register against the side of the cassette in the same manner as if no pallet were being used. In this embodiment spring clip 216 is used to retain the cassette firmly in position on the pallet 210 along with a retaining clip 218 placed in the support surface 12 of the pallet 210.

The present invention provides a pallet for holding cassettes of different sizes which simplifies the handling of the cassette, reduces operator time required to provide the cassette to a reader, is easy to use, is low cost, and provides the pallet in a seated position to the reader.

It is to be understood that various other changes and modifications may be made without departing from the scope of the present invention. The present invention being limited by the following claims.

We claim:

1. A pallet for holding at least two different size cassettes, the cassettes each having a pair of side walls, a front wall and a back wall, said pallet comprising:
   a support surface for supporting a cassette;
   a first internal side wall for registering one of the side walls of a cassette placed on said support surface;
   a second internal side wall for registering the other side wall of said cassette;
   a third internal side wall for registering the back wall of the cassette, said first, second and third internal side walls defining a recess for holding in position a cassette of a first size;
   a projection retractably mounted to the pallet at a predetermined position along said first internal side wall for movement between an operational position and an non operational position, when said projection is in the operational position said first and second internal side walls and said projection define a second recess for holding a cassette of a second size smaller than said first size, and for registering the back wall of the cassette of a second smaller size when said projection is in the non operational position the projection is outside of said first defined recess.

2. A pallet according to claim 1 further comprising means for locking said projection in the operational and non operational positions.

3. A pallet according to claim 2 wherein said means for locking said projection in the operational and non operational positions comprises a spring loaded plunger mounted to said projection and a pair of depression in the surface of the cassette beneath where the projection slides, said depressions being positioned on the pallet such that it will lock the projection in the operational and non operational positions.

4. A pallet according to claim 1 further comprising means for applying a biasing force against a cassette placed in said defined recesses so as to bias the cassette against said second internal side wall.

5. A pallet according to claim 4 wherein said means for applying a biasing force comprises a plurality of spring loaded detent elements placed in said first internal side wall at predetermined spaced locations 6. A pallet according to claim 1 wherein said support surface is provided with a recess for receiving the edge of the cassette when placed in the first or second defined recess.

7. A pallet according to claim 1 wherein said pallet is integrally molded of a plastic material.

8. A pallet according to claim 7 wherein the pallet is provided with cut out sections so as to reduce the weight of the pallet, the cutout section being sized and positioned so that the pallet containing the cassette has substantially the same center of gravity as the large cassette the pallet is designed to replace.

9. A pallet according to claim 1 wherein said pallet further comprises a first outer side wall, a second outer side wall and a third outer side wall, said first outer side wall being substantially parallel and spaced from said first internal side wall, said second outer side wall being substantially parallel and spaced from said second internal side wall, said third outer side wall being substantially parallel and spaced from said third internal side wall, said first and second outer side walls being space apart a predetermined distance so as to be substantially equal to standard size cassette larger than said cassettes of said first and second sizes.

10. A pallet for holding at least two different size cassettes, the cassettes each having a pair side walls, a front wall and a back wall, said pallet comprising:
a support surface for supporting a cassette;
a first internal side wall for registering one of the side walls of a cassette placed on said support surface;
a second internal side wall for registering the other side wall of said cassette;
a third internal side wall for registering the back wall of the cassette, said first, second and third internal side walls defining a recess for holding in position a cassette of a first size;
retractable means mounted to the pallet for defining a second recess for holding a cassette of a second size smaller than said first size within the area of said first defined recess, and for registering the back wall of the cassette of a second smaller size when said means is in the non operational position it is outside of said first defined recess.

11. A pallet according to claim 10 further comprising means for locking said projection in the operational and non operational positions.

12. A pallet according to claim 11 wherein said means for locking said projection in the operational and non operational positions comprises a spring loaded detent elements mounted to said projection and a pair of depression in the surface of the cassette beneath where the projection slides, said depressions being positioned on the pallet such that it will lock the projection in the operational and non operational positions.

13. A pallet according to claim 10 further comprising means for applying a biasing force against a cassette placed in said defined recesses so as to bias the cassette against said second internal side wall.

14. A pallet according to claim 13 wherein said means for applying a biasing force comprises a plurality of detent elements placed in said first internal side wall at predetermined spaced locations.

15. A pallet according to claim 10 wherein said support surface is provided with a recess for receiving the edge of the cassette when placed in the first or second defined recess.

16. A pallet according to claim 10 wherein said pallet is integrally molded of a plastic material.

17. A pallet according to claim 16 wherein the pallet is provided with cut out sections so as to reduce the weight of the pallet, the cutout section being sized and positioned so that the pallet containing the cassette has substantially the same center of gravity as the large cassette the pallet is designed to replace.

18. A pallet according to claim 10 wherein said pallet further comprises a first outer side wall, a second outer side wall and a third outer side wall, said first outer side wall being substantially parallel and spaced from said first internal side wall, said second outer side wall being substantially parallel and spaced from said second internal side wall, said third outer side wall being substantially parallel and spaced from said third internal side wall, said first and second outer side walls being space apart a predetermined distance so as to be substantially equal to standard size cassette larger than said cassettes of said first and second sizes.

19. A pallet for holding at least two different size cassettes, the cassettes each having a pair of side walls, a front wall and a back wall, said pallet comprising:
a support surface for supporting a cassette;
a first internal side wall for registering one of the side walls of a cassette placed on said support surface;
a second internal side wall for registering the back wall of the cassette, said first, and second internal side walls defining a recess for holding in position a cassette of a first size;
a projection retractably mounted to the pallet at a predetermined position along said first internal side wall for movement between an operational position and an non operational position, when said projection is in the operational position said first and second internal side walls and said projection define a second recess for holding a cassette of a second size smaller than said first size, and providing a surface for registering the back wall of the cassette of a second smaller size when said projection is in the non operational position the projection is outside of said first defined recess.

20. A pallet according to claim 19 further comprising means for locking said projection in the operational and non operational positions.

21. A pallet according to claim 20 wherein said means for locking said projection in the operational and non operational positions comprises a spring loaded detent element mounted to said projection and a pair of depression in the surface of the cassette beneath where the projection slides, said depressions being positioned on the pallet such that it will lock the projection in the operational and non operational positions.

22. A pallet according to claim 19 further comprising means for applying a biasing force against a cassette placed in said defined recesses so as to bias the cassette against said second internal side wall.

23. A pallet according to claim 22 wherein said means for applying a biasing force comprises a plurality of spring loaded detent elements placed in said first internal side wall at predetermined spaced locations 24. A pallet according to claim 19 wherein said support surface is provided with a recess for receiving the edge of the cassette when place in the first or second defined recess.

25. A pallet according to claim 19 wherein said pallet is integrally molded of a plastic material.

26. A pallet according to claim 25 wherein the pallet is provided with cut out sections so as to reduce the weight of the pallet.

27. A pallet according to claim 19 wherein said pallet further comprises a first outer side wall and a second outer side wall, said first outer side wall being substantially parallel and spaced from said first internal side wall, said second outer side wall being substantially parallel and spaced from said second internal side wall.

* * * * *